US010337933B2

(12) United States Patent
Serrell

(10) Patent No.: US 10,337,933 B2
(45) Date of Patent: Jul. 2, 2019

(54) STIRRING PADDLE FOR ISOTHERMAL TITRATION CALORIMETRY

(71) Applicant: Waters Technologies Corporation, Milford, MA (US)

(72) Inventor: David Serrell, Draper, UT (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 492 days.

(21) Appl. No.: 15/084,589

(22) Filed: Mar. 30, 2016

(65) Prior Publication Data

US 2016/0305828 A1 Oct. 20, 2016

Related U.S. Application Data

(60) Provisional application No. 62/148,832, filed on Apr. 17, 2015.

(51) Int. Cl.
| | |
|---|---|
| *B01J 19/00* | (2006.01) |
| *G01K 17/00* | (2006.01) |
| *B01F 7/00* | (2006.01) |

(52) U.S. Cl.
CPC .............. *G01K 17/00* (2013.01); *B01F 7/001* (2013.01); *B01F 7/007* (2013.01); *B01F 7/0015* (2013.01); *B01F 7/00275* (2013.01); *B01F 2215/0422* (2013.01); *B01F 2215/0431* (2013.01)

(58) Field of Classification Search
CPC ..... B01J 19/0066; G01K 17/00; G01N 25/20; B01F 7/001; B01F 7/00141; B01F 7/00091; B01F 7/00275
See application file for complete search history.

(56) References Cited

U.S. PATENT DOCUMENTS

| | | | | |
|---|---|---|---|---|
| 3,751,010 A | * | 8/1973 | Latinen | B01F 7/02 159/25.1 |
| 8,449,175 B2 | | 5/2013 | Plotnikov et al. | |
| 8,827,549 B2 | | 9/2014 | Plotnikov et al. | |
| 2003/0156989 A1 | * | 8/2003 | Safir | B01F 7/167 422/130 |
| 2012/0032007 A1 | * | 2/2012 | Mulder | B02C 18/10 241/8 |

* cited by examiner

*Primary Examiner* — Jill A Warden
*Assistant Examiner* — Dwayne K Handy
(74) *Attorney, Agent, or Firm* — Schmeiser, Olsen & Watts LLP

(57) ABSTRACT

A stirring paddle for isothermal titration calorimetry includes a blade secured to one end of a shaft. The blade has an edge and a pair of opposing surfaces. A lip extends from the edge and forms a non-zero angle with respect to the opposing surfaces. In some embodiments, the blade has a twisted rectangular shape defined by a pair of first opposing edges and a pair of second opposing edges. One of the first opposing edges is oriented at a rotation angle with respect to the shaft axis that is different than an orientation of the other first opposing edge with respect to the shaft axis. Advantageously, the stirring paddle achieves improved turbulent mixing of injections into liquid within a sample cell, resulting in shorter measurement times. The improved mixing efficiency allows the stirring paddle to be operated at a lower rotation rate.

19 Claims, 6 Drawing Sheets

STIRRING PADDLE FOR ISOTHERMAL TITRATION CALORIMETRY

RELATED APPLICATION

This application claims the benefit of the earlier filing date of U.S. Provisional Patent Application No. 62/148,832, filed Apr. 17, 2015 and titled "Stirring Paddle for Isothermal Titration calorimetry," the entirety of which is incorporated herein by reference.

FIELD OF THE INVENTION

The invention relates generally to calorimetry. More particularly, the invention relates to a stirring paddle for isothermal titration calorimetry.

BACKGROUND

Isothermal titration calorimetry is a technique in which the thermodynamic properties of interactions of solutions are determined. For example, exothermic or endothermic reactions produce heat which can be measured using an isothermal titration calorimeter (ITC). Such reactions include the binding of small molecules to macromolecules.

Typical ITCs include a reference cell and a sample cell. The reference cell contains a reference liquid such as water and the sample cell holds a sample solution containing a first substance. A constant cooling power is applied to the sample cell. Temperature sensing circuitry is used to detect a temperature difference between the reference cell and the sample cell. A feedback circuit controls a heater for the sample cell to maintain equal cell temperatures. As a titrant containing a second test substance is injected into the sample cell in accurately controlled volumes, heat is either generated or absorbed according to the type of reaction between the first and second test substances. Consequently, the power supplied by the heater to the sample cell will change so that the temperatures of the two cells remain equal. This power is monitored over time and results in a series of peaks being observed with each peak corresponding to an injection of the test solution into the sample cell. Each peak can be integrated over time to yield the total heat generated for the injection. The detected peaks yield information on the thermodynamic parameters of the interaction of the test substances.

During a single injection, the titrant does not immediately disperse throughout the volume of the sample solution and therefore the reaction is observed over a finite time corresponding to the width of the observed peak. To mix the solutions more rapidly, a stirring paddle is rotated inside the sample cell. The stirring paddle typically includes a hollow shaft with a stirring blade attached at the end of the shaft inside the sample cell. The injection is introduced into the sample cell through the hollow shaft and through a bore in the paddle blade.

Conventional stirring paddles are typically rotated at high speeds (e.g., several hundred rotations per minute (RPM)) to achieve sufficient mixing for ITC detection and analysis. For a full baseline-resolved measurement, a number of injections typically occur and the time required to complete the measurement is dependent on the mixing efficiency of the injections.

SUMMARY

In one aspect, a stirring paddle for an isothermal titration calorimeter includes a blade and a shaft having a shaft axis. The blade is secured to one end of the shaft and has an edge and a pair of opposing surfaces. The stirring paddle also includes a lip extending from the edge at a non-zero angle relative to the opposing surfaces. In one embodiment, the blade has a twisted rectangular shape defined by a pair of first opposing edges and a pair of second opposing edges. One of the first opposing edges is oriented at a rotation angle with respect to the shaft axis that is different than an orientation of the other of the first opposing edges with respect to the shaft axis.

In another aspect, an isothermal titration calorimeter includes a sample cell having an opening, a stirring paddle and an injection system. The stirring paddle includes a shaft, a blade and a lip. The shaft has a shaft axis and extends through the opening of the sample cell. The blade is secured to one end of the shaft and has an edge and a pair of opposing surfaces. The blade is disposed within the sample cell. The lip extends from the edge at a non-zero angle relative to the opposing surfaces. The injection system includes a syringe pump to provide a titrant and an injection tube in communication with the syringe pump. The injection tube has an axis that is parallel to the shaft axis and extends through the opening to enable the titrant to be dispensed into the sample cell.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
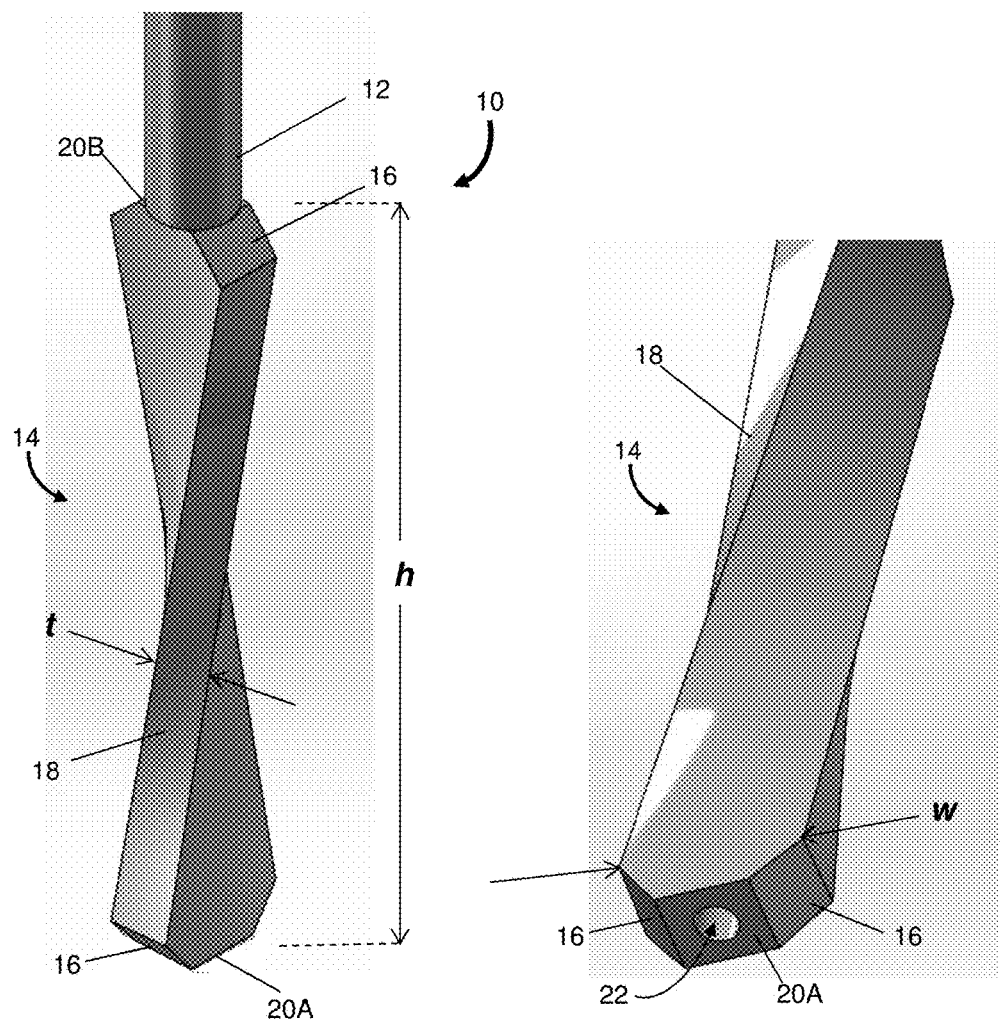
FIG. 1A is a perspective illustration of a conventional stirring paddle for an ITC instrument and FIG. 1B is a perspective view of a portion of the stirring paddle of FIG. 1A.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The term "blade" as used herein means the wide flat portion of a paddle. The phrase "twisted rectangular plate" means a plate shaped, for example, from a nominally rectangular plate that is subsequently deformed so that one edge of the rectangular plate is rotated about an axis perpendicular to that edge and to an opposite edge, resulting in angular orientations of the edge and the opposite edge with respect to the axis that are different. As used herein, an object shaped as a twisted rectangular plate does not require that its manufacture include a twisting of the object. For example, the object may be formed by injection molding. The terms injection tube and syringe are used interchangeably herein and refer generally to a conduit used to deliver a titrant from a syringe pump into a sample cell.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

FIG. 1A is an illustration of a conventional stirring paddle 10 for an ITC. The paddle 10 includes a hollow shaft 12 and a blade 14 fixed at an end of the shaft 12 that can be positioned inside a sample cell. The blade 14 is in the form of a twisted rectangular plate with angled edges 16 at the corners of the rectangle where the longer edges 18 and shorter edges 20 would otherwise meet. The twisting is defined by a rotation about an axis through the blade 14 that is co-linear with the longitudinal axis of the shaft, with the angular orientation of the bottom shorter edge 20A being effectively rotated about the blade axis relative to the angular orientation of the top shorter edge 20B where the blade 14 meets the shaft 12. FIG. 1B is a perspective illustration of a portion of the stirring paddle 10 of FIG. 1A and shows the end of a fluid channel (e.g., a bore) 22 through which a sample solution can be injected into a sample cell. By way of a specific numerical example, the distance h between the two short edges 20 is 0.330 in. (8.38 mm), the distance w between the two longer edges 18 is 0.090 in. (2.29 mm), the blade thickness t is 0.040 in. (1.02 mm) and the diameter of the fluid channel 22 is 0.020 in. (0.51 mm).

The blade 14 is arranged to be submerged in a liquid inside a sample cell (not shown). The shaft 12 extends vertically upward from the sample cell to a motor mechanism which rotates the shaft 12 and blade 14 about an axis that is co-linear with the shaft axis. To mix an injection from the fluid channel 22 into the solution inside the sample cell, the stirring paddle 10 is rotated about the shaft axis. The rate of rotation affects how quickly the injection is mixed with the solution. An increased rotation rate generally yields a higher amplitude peak and narrower peak width for each injection, and reduces the time necessary for the ITC to perform all the injections and complete a full measurement.

One disadvantage of the stirring paddle 10 is the blade thickness t which is necessary to accommodate the diameter of the fluid channel 22 but which limits the mixing efficiency. In an ideal measurement, the injected titrant is blended throughout the volume of the solution in the sample cell as quickly as possible to enable the chemical reactions resulting from the injection to occur rapidly. In practice, this is difficult to achieve. For example, the sample cell may have a small volume (e.g., 0.2 mL) and the ability to achieve a turbulent flow for the injected solution is difficult, especially for injections of denser solutions. Moreover, the rotation of the blade 14 inside the sample cell can generate heat that may degrade measurement data.

In brief overview, embodiments of a stirring paddle for an ITC according to principles of the invention include a blade secured to one end of a shaft. The blade has an edge and a pair of opposing surfaces. A lip extends from the edge and forms a non-zero angle with respect to the opposing surfaces. In one embodiment, the blade has a twisted rectangular shape defined by a pair of first opposing edges and a pair of second opposing edges. One of the first opposing edges is oriented at a rotation angle with respect to the shaft axis that is different than an orientation of the other of the first opposing edges with respect to the shaft axis. Advantageously, embodiments of stirring paddles described herein achieve improved turbulent mixing of injections with liquid within the sample cell and improve the transfer of the injected liquid between the upper and lower regions of the sample cell. Thus shorter ITC measurement times are enabled. Due to the improved mixing efficiency, the stirring paddle can be operated at a lower rotation rate and therefore can reduce the amount of mechanical heat generated in the mixed solution due to paddle rotation. Additionally, slower speeds produce less potentially damaging shear force on delicate molecules.

Figure 2:
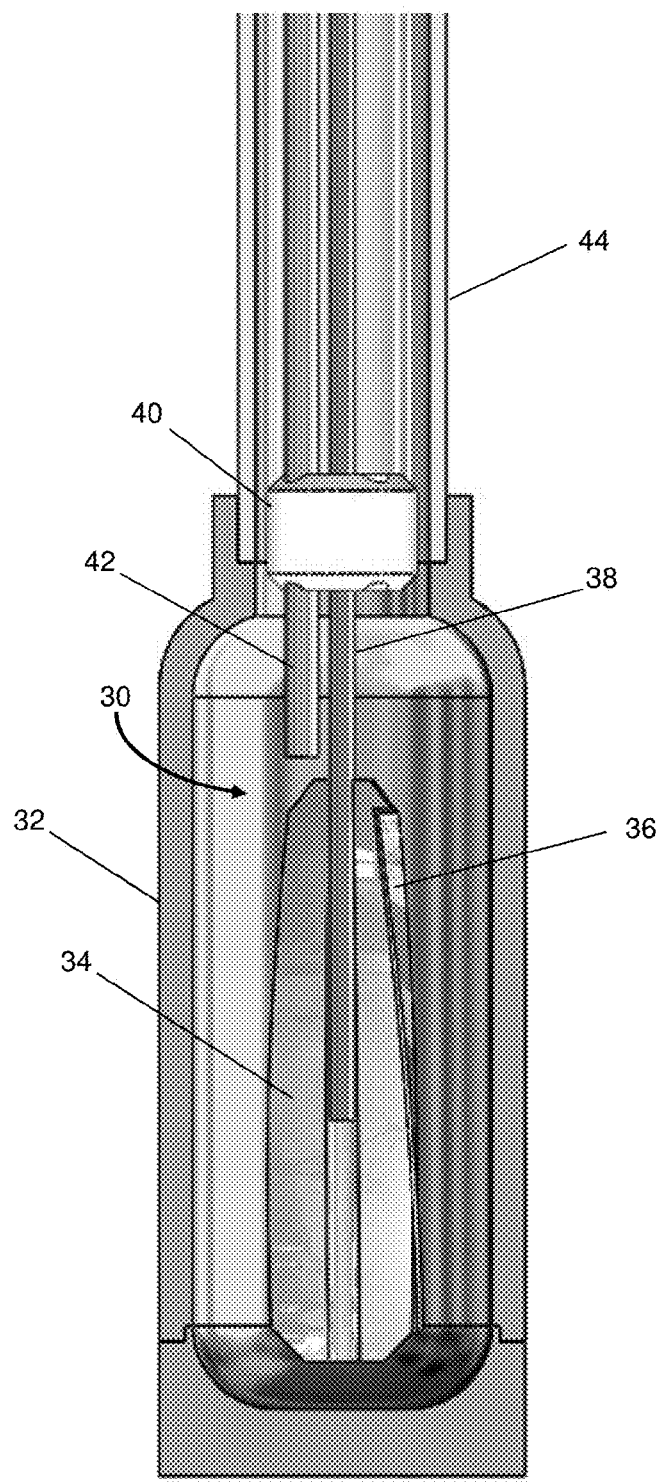
FIG. 2 shows a stirring paddle inside a sample cell according to an embodiment of the invention.
Figure 3:
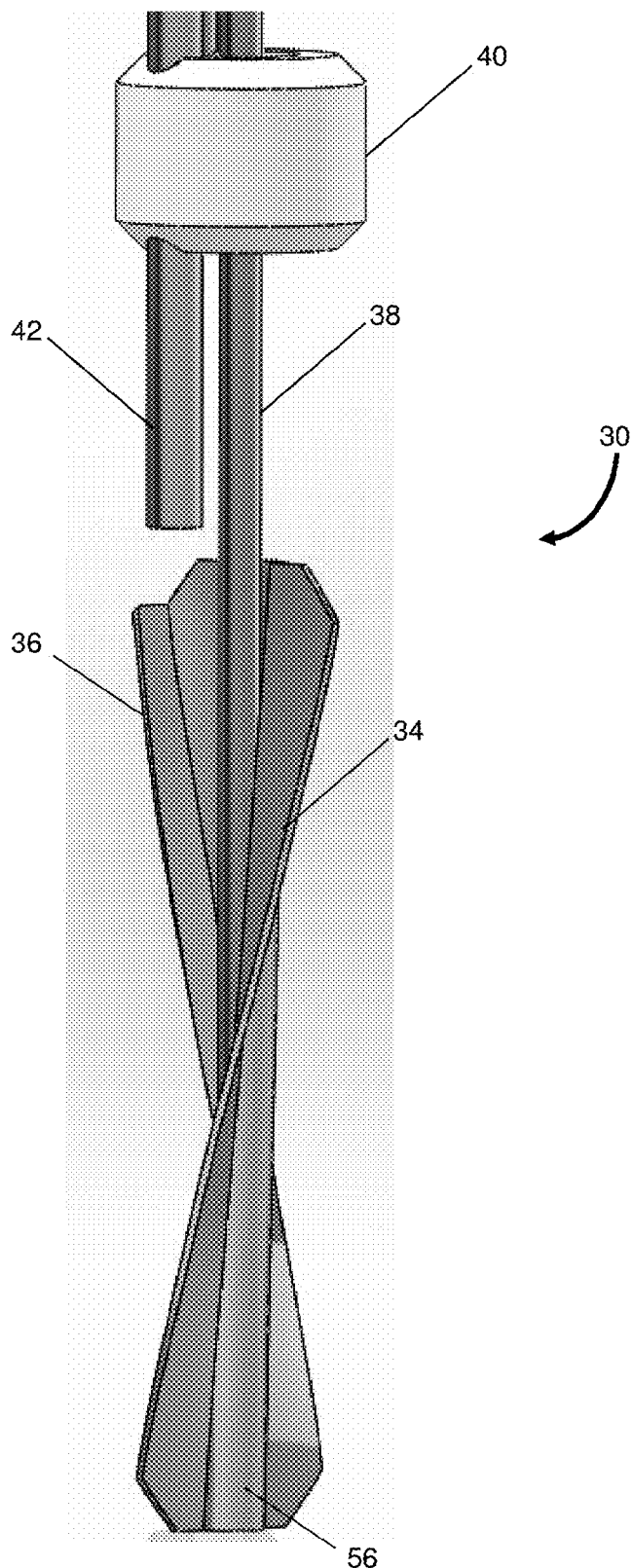
FIG. 3 is an illustration of a portion of the stirring paddle of FIG. 2 shown without the sample cell.

FIG. 2 shows a sample cell 32 in a cut-away view to show an embodiment of a stirring paddle 30 according to the invention. FIG. 3 shows a magnified version of a portion of the stirring paddle 30 without a sample cell. Referring to both figures, the stirring paddle includes a blade 34 having a lip 36 along one edge. By way of examples, the blade 34 and lip 36 may be formed of a thermoplastic polymer, such as polyether ether ketone (PEEK), or formed in an injection mold process from liquid crystal polymer (LCP). The blade 34 is secured at one end of a solid cylindrical shaft 38, such as a stiff wire, that extends upward from the sample cell 32 to a motor mechanism (not shown) through an insulator 40. Unlike the conventional stirring paddle 10 of FIG. 1, the injection is not provided through the stirring paddle 30. Instead, injections are provided from a syringe pump through a syringe, or injection tube, 42 that extends upward from the sample cell 32 through the insulator 40 and parallel to the shaft 38. The insulator 40 maintains the proper registration of the shaft 38 and injection tube 42 with respect to each other and to the sample cell 32. In addition, the insulator 40 is formed of a material, such as PEEK, that provides a high thermal resistance. The shaft 38 and injection tube 42 are protected by a larger diameter tube 44 that extends upward from the opening at the top of the sample cell 32. The separate injection tube 42 enables the thickness and mass of the blade 34 to be substantially less than that of the counterpart blade 14 in FIG. 1. In addition, the thinner shaft 38 reduces the opportunity for contacting the sample cell 32 or the inside of the tube 44 during rotation which can occur with the thicker shaft 12 in FIG. 1. Such contact can generate heat which may not be properly accounted for in measurement data.

The improved shearing of the liquid in the sample cell 32 resulting from the lip 36 at the edge of the blade 34 enhances the turbulent mixing and the transfer of liquids throughout the internal volume of the sample cell 32. By way of a non-limiting numerical comparative example, the stirring paddle of FIG. 1 can be operated at 350 RPM while the stirring paddle of FIG. 2 in a sample cell of the same volume can achieve similar mixing at a rotation rate between approximately 75 RPM to 100 RPM.

Figure 4:
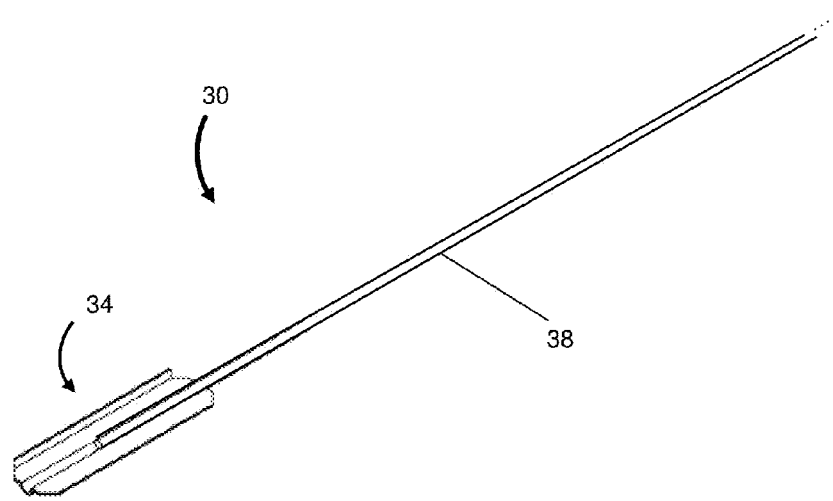
FIG. 4 is a perspective view of the stirring paddle of FIG. 2 prior to twisting the blade into its final shape.
Figure 5:
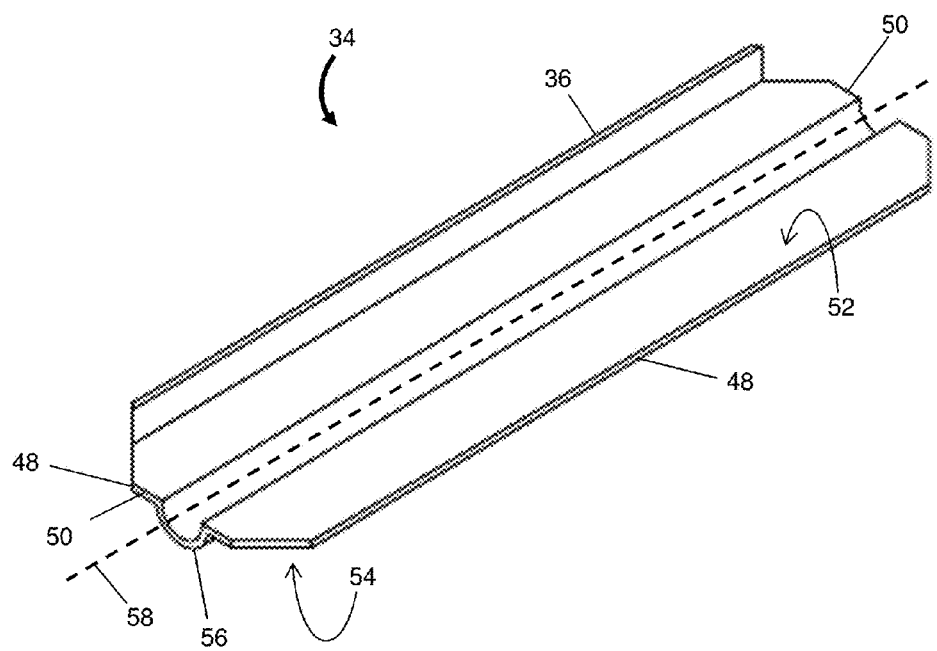
FIG. 5 shows an enlarged perspective view of the blade of the stirring paddle in FIG. 4 prior to twisting the blade into its final shape.
Figure 6A:
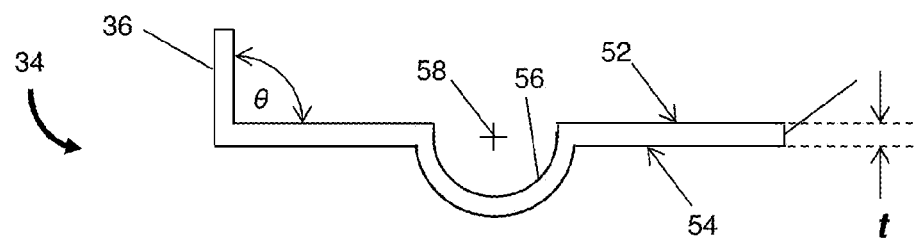
FIG. 6A, FIG. 6B and FIG. 6C show a cross-sectional end view, a top view and a side view, respectively, of the blade shown in FIG. 5.
Figure 6B:
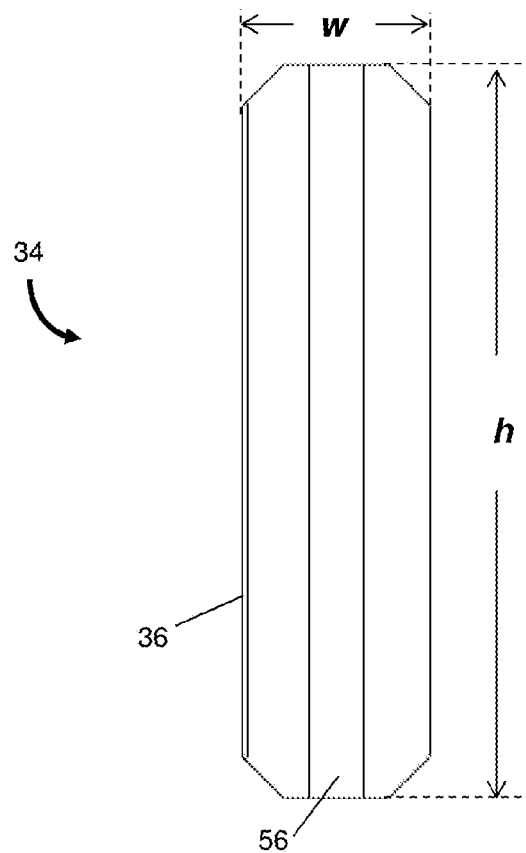
Figure 6C:
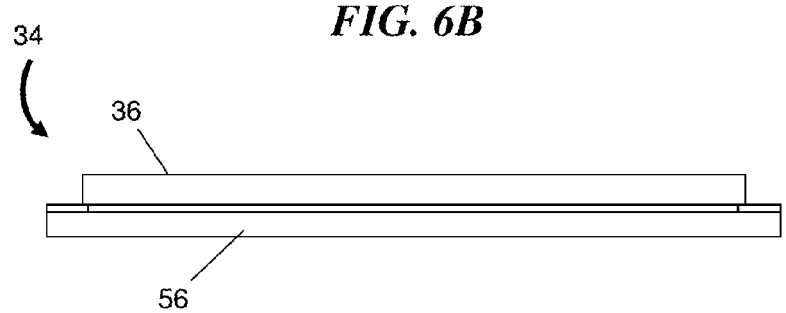

FIG. 4 and FIG. 5 show a perspective view of the stirring paddle 30 and an enlarged perspective view of the blade 34, respectively, prior to the twisting of the blade 34 into its final shape. FIG. 6A, FIG. 6B and FIG. 6C show a cross-sectional end view, a top view and a side view, respectively, of the blade 34 of FIG. 5. The blade 34 may be formed of sheet metal and attached to one end of the shaft 38 by laser welds or by other techniques as are known in the art. A curved groove 56 that is formed parallel to the longer edges 48 receives a portion of the length of the shaft 38 so that the center of curvature of the groove 56 is nominally co-linear with the axis 58 of the shaft.

By way of a non-limiting numerical example, the distance h between the two short edges 50 is 0.350 in. (8.89 mm), the distance w between the two longer edges 48 is 0.090 in. (2.29 mm), the blade thickness t (i.e., the separation between the opposing surfaces 52 and 54) is 0.003 in. (0.076 mm) and the diameter of the shaft 38 is 0.015 in. (0.38 mm). The lip 36 extends at an angle θ of 90° from the surface 52 for a distance of 0.015 in. (0.38 mm).

Although shown as formed from sheet metal, in other embodiments the blade 34 can be formed through an injection molding process, for example, using LCP or another material having acceptable chemical and thermal properties.

Although the lip is shown to extend at 90° from the opposing surfaces of the blade, in alternative embodiments the angle θ is greater than 0° but may be less than or greater than 90°. Moreover, other embodiments may use multiple lips along one or more edges of the blade 34.

Although the blade 34 and lip 36 are shown and described as being formed as a single integral element, in some embodiments the blade 34 and lip 36 may be formed independently and fixed to each other.

Figure 7:
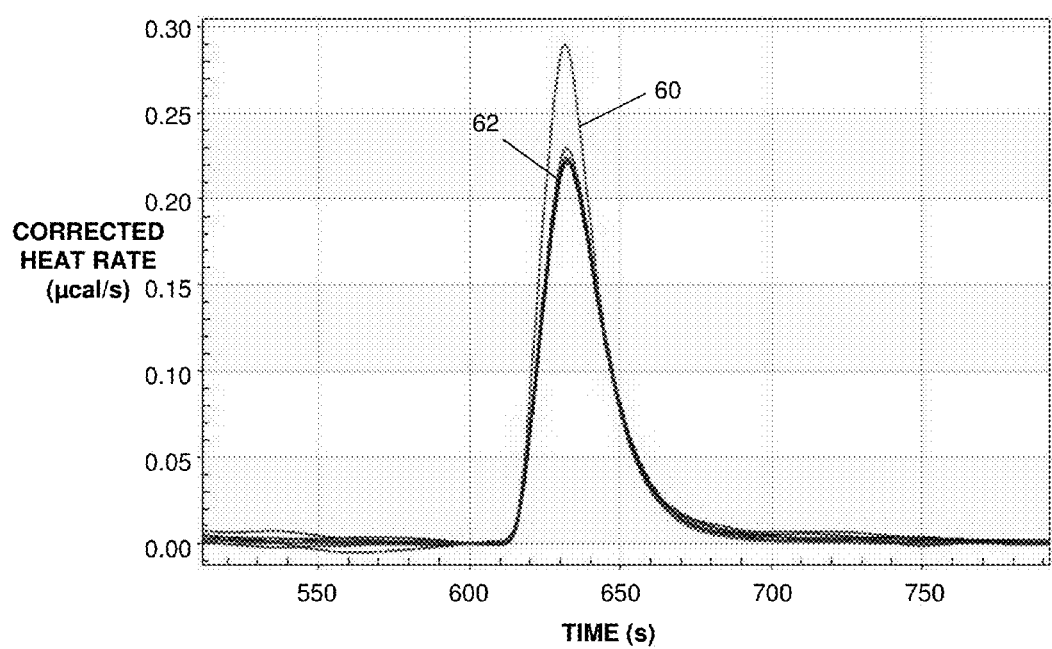
FIG. 7 is a graphical representation of ITC data obtained using a conventional stirring paddle at 350 RPM and a stirring paddle according to FIG. 3 at 150 RPM.

FIG. 7 shows a plot 60 of ITC data obtained using a Nano ITC microcalorimeter system having a stirring paddle as shown in FIG. 1. The data were obtained with the stirring paddle rotating at 350 RPM. FIG. 7 also shows a plot 62 of ITC data obtained using an Affinity ITC microcalorimeter system having a stirring paddle as shown in FIG. 3 with a lower rotation rate of 150 RPM. Both microcalorimeters are available from TA Instruments® of New Castle, Del. The sample cell contained a dilute potassium bicarbonate solution and dilute hydrochloric acid was used for the injections.

Typically, a slower rotation rate corresponds to a broader injection peak. In this instance, the improved mixing efficiency realized with the stirring paddle configuration of FIG. 3 results in injection peaks that are nearly equal in width to the injection peaks obtained using the stirring paddle configuration of FIG. 1 even though the rotation rate was substantially less.

While the invention has been shown and described with reference to specific embodiments, it should be understood by those skilled in the art that various changes in form and detail may be made therein without departing from the spirit and scope of the invention as recited in the accompanying claims.

What is claimed is:

1. A stirring paddle for an isothermal titration calorimeter comprising:
   a shaft having a shaft axis;
   a blade secured to one end of the shaft and having a length and a pair of opposing surfaces, the blade defined by:
      a top edge extending radially outward from the shaft axis at a first location of the shaft along the length;
      a bottom edge extending radially outward from the shaft axis at a second location of the shaft along the length;
      a first curved outer edge extending along the length between the top edge and the bottom edge; and
      a lip extending from the first curved outer edge at a non-zero angle relative to the opposing surfaces,
      wherein the blade has a twisted rectangular shape such that a rotation angle of the blade with respect to the shaft axis varies along the length.

2. The stirring paddle of claim 1 wherein the non-zero angle is approximately 90°.

3. The stirring paddle of claim 1 wherein one of the top edge is oriented at a rotation angle with respect to the shaft axis that is different than an orientation of the bottom edge with respect to the shaft axis.

4. The stirring paddle of claim 1 wherein the blade is formed of sheet metal.

5. The stirring paddle of claim 1 wherein the blade and the lip are injected molded as an integral element.

6. The stirring paddle of claim 1 wherein the blade includes a groove to receive a portion of a length of the shaft.

7. The stirring paddle of claim 1 wherein the blade is secured to the one end of the shaft by a weld.

8. The stirring paddle of claim 1 wherein the shaft has a solid cylindrical shape.

9. The stirring paddle of claim 1 where the blade and the lip are formed as an integral element.

10. An isothermal titration calorimeter comprising:
    a sample cell having an opening;
    a stirring paddle comprising:
       a shaft having a shaft axis and extending through the opening of the sample cell;
       a blade secured to one end of the shaft and having a length and a pair of opposing surfaces, the blade being disposed within the sample cell, the blade including:
          a top edge extending radially outward from the shaft axis at a first location of the shaft along the length;
          a bottom edge extending radially outward from the shaft axis at a second location of the shaft along the length;
          a first curved outer edge extending along the length between the top edge and the bottom edge; and
          a lip extending from the first curved outer edge at a non-zero angle relative to the opposing surfaces,
          wherein the blade has a twisted rectangular shape such that a rotation angle of the blade with respect to the shaft axis varies along the length; and
    an injection system comprising:
       a syringe pump to provide a titrant; and
       an injection tube in communication with the syringe pump, the injection tube having an axis that is parallel to the shaft axis and extending through the opening to dispense the titrant into the sample cell.

11. The isothermal titration calorimeter of claim 10 wherein one of the top edge is oriented at a rotation angle with respect to the shaft axis that is different than an orientation of the bottom edge with respect to the shaft axis.

12. The isothermal titration calorimeter of claim 10 wherein the non-zero angle is approximately 90°.

13. The isothermal titration calorimeter of claim 10, wherein the blade further includes a second curved outer edge extending along the length between the top edge and the bottom edge, wherein the first curved outer edge extends from a first end of the top edge to a first end of the bottom edge and wherein the second curved outer edge extends from a second end of the top edge to a second end of the bottom edge, wherein the second curved outer edge does not include an extending lip.

14. The isothermal titration calorimeter of claim 13, wherein the blade further includes a grove that is nominally co-linear with the shaft axis.

15. The isothermal titration calorimeter of claim 13, wherein the top edge further includes a first angled edge at the first end of the top edge and a second angled edge at a second end of the top edge, and wherein the bottom edge further includes a first angled edge at the first end of the bottom edge and a second angled edge at a second end of the bottom edge.

16. The stirring paddle of claim 1, wherein the blade further includes a second curved outer edge extending along the length between the top edge and the bottom edge, wherein the first curved outer edge extends from a first end of the top edge to a first end of the bottom edge and wherein the second curved outer edge extends from a second end of the top edge to a second end of the bottom edge, wherein the second curved outer edge does not include an extending lip.

17. The stirring paddle of claim 16, wherein the blade further includes a grove that is nominally co-linear with the shaft axis.

18. The stirring paddle of claim 16, wherein the top edge further includes a first angled edge at the first end of the top edge and a second angled edge at a second end of the top edge, and wherein the bottom edge further includes a first angled edge at the first end of the bottom edge and a second angled edge at a second end of the bottom edge.

19. The stirring paddle of claim 1, wherein the non-zero angle is less than 90°.

\* \* \* \* \*